United States Patent [19]

Mearns

[11] 4,162,377

[45] Jul. 24, 1979

[54] DATA BASE AUTO BILL CALLING USING CCIS DIRECT SIGNALING

[75] Inventor: Allison B. Mearns, Ocean, N.J.

[73] Assignee: Bell Telephone Laboratories, Incorporated, Murray Hill, N.J.

[21] Appl. No.: 924,169

[22] Filed: Jul. 13, 1978

[51] Int. Cl.² .......................................... H04M 15/00
[52] U.S. Cl. .............................. 179/18 D; 179/18 C; 179/27 FF
[58] Field of Search ............. 179/18 C, 18 D, 18 DA, 179/27 FF

[56] References Cited

U.S. PATENT DOCUMENTS

| | | | |
|---|---|---|---|
| 3,555,198 | 4/1968 | Stepan et al. | 179/18 D |
| 3,654,396 | 10/1969 | Biezeveld | 179/18 D |
| 3,660,612 | 6/1970 | Schluter et al. | 179/18 D |
| 4,093,825 | 6/1978 | Gladstone et al. | 179/27 FF |

Primary Examiner—William C. Cooper
Attorney, Agent, or Firm—Frederick W. Padden

[57] ABSTRACT

A method is disclosed for automatically processing call data from a TSPS (Traffic Service Position System) over CCIS (Common Channel Interoffice Signaling) facilities to a remotely located data base system to verify the entitlement of the caller to bill the call on a credit card, collect and charge-to-a-third number basis. The call data is dialed by the caller and comprises a credit card or station number together with a PIN (Personal Identification Number) used by authorized callers in placing the special service calls. The data base system includes a memory table of authorized numbers to which the calls are charged and billed. The data base transmits CCIS direct signaling verification messages through the signal transfer system to the TSPS signifying the entitlement and nonentitlement of the caller to the call service.

12 Claims, 2 Drawing Figures

AUTO BILL CALLING USING CCIS DIRECT SIGNALING

AUTO BILL CALLING USING CCIS DIRECT SIGNALING

DATA BASE AUTO BILL CALLING USING CCIS DIRECT SIGNALING

TECHNICAL FIELD

This invention relates to communication call charging and billing and particularly to a method of automatically processing special service calls, such as credit card, collect and charge-to-a-third number calls without the intervention of an operator.

BACKGROUND ART

A substantial percentage of special service calls, such as credit card, collect and charge-to-a-third number, require the services of an operator for their completion. The actual amount of such operator service has, in the lase decade, been greatly reduced by the widespread commerical use of communication customer service systems, such as TSPS (Traffic Service Position System) equipment. It has improved call processing efficiency and the reductions in manual functions have resulted in savings in the number of required operators. R. J. Jaeger, Jr. A. E. Joel, Jr. U.S. Pat. No. 3,484,560 of Dec. 16, 1969 and the December 1970 Bell System Technical Journal, 49, BSTJ No. 10, page 2417 et seq. disclose the structure and operations of TSPS equipment on calls requiring operator assistance.

The telephone industry has long recognized that the volume of calls requiring operator assistance will increase in the future to the extent that there is a probability that enough operators will not be available to serve those calls at reasonable costs to customers. As a consequence, the industry has continually maintained projects to provide more automated procedures and equipments to reduce the need for operator assistance. One such project has resulted in the development of automated coin toll service as an adjunct to a TSPS system. Automated coin toll service facilities are disclosed, for example, in R. M. Dudonis U.S. Pat. No. 4,031,324 of June 21, 1977 and N. R. Shaer U.S. Pat. No. 3,453,389 of July 1, 1969.

Despite the forecast increased demand for operators and the progress in automating certain types of special service calls, it has heretofore been a persistent problem to process calls, such as credit card, collect and charge-to-a-third number calls, without operator intervention.

Another significant problem for telephone companies has been that many such special service calls are fraudulently placed by callers as collect or charge-to-a-third number calls billed to coin telephone stations and as credit calls using improper credit card and third numbers or unauthorized use of valid credit card and third numbers. Present day telephone systems and call processing procedures are not equipped adequately to detect such fraud. Recent estimates are that annualized telephone company revenue losses due to suspected fraud on special service calls exceed several million dollars. Although credit card fraud appears to be decreasing, fraudulent charges to third numbers and other fraud, such as on collect calls, are increasing.

A need therefore has heretofore existed for facilities which virtually eliminate the requirement for operator assistance on such special service calls particularly for charging and billing. A specific need has existed for facilities to reduce fraudulent completion, as well as charging and billing on credit card, collect and third number calls.

DISCLOSURE OF THE INVENTION

The foregoing problems are solved and a technical advance is achieved by a method of automatically processing special service call billing information from a communication system over CCIS (Common Channel Interoffice Signaling) facilities to a data base system to verify the entitlement of a caller to charge and bill the call to a number other than that of the station from which the call is originated. The data base receives billing information including a special entitlement code illustratively dialed by the caller and translates it, for example, into an authorized or nonauthorized signal for transmission over the CCIS facilities to the communication system for controlling the further establishment of call connections to the called station or to equipment which reports a service denial message to the caller. Thus, fraud calls are blocked from completion.

The method is referred to as ABC (Auto Bill Calling) service and furnishes automated collect calling and unrestricted credit calling on credit card and charge-to-a-third number calls. Such a call is originated in a conventional manner and is illustratively routed through a local telephone switching office to a TSPS system in response to a caller dialing the called station number. Upon receipt of the call, the TSPS center returns a prompting signal, such as a tone or tone plus a machine announcement, to the caller as an indication to dial the billing information into the TSPS equipment. For a credit card or third number call, the billing information is, for example, the caller's home or business telephone number and advantageously a PIN (Personal Identification Number) code. A collect call to a called number which is the billed number only requires the dialing of the PIN code following the prompting signal because the called number is already available at the TSPS center. The PIN code is furnished by the telephone company to the customer to be charged and billed for the calls and that customer, in turn, supplies the number to persons authorized to place calls at the customer's expense.

The TSPS center in conjunction with the CCIS facilities formulates a direct signaling message, including the call billing information and transmits it to a signal transfer point, or system, which determines the appropriate data base system to which the message is then sent. The data base is responsive to the receipt of the special service call billing message for examining a memory table to locate and verify the entitlement of the call to the ABC service. If the billing message (area code+station number +PIN) is not listed in the memory table, the call service is not authorized and the data base system formulates and returns a nonauthorized CCIS direct signaling message to the TSPS system via the CCIS facilities including the signal transfer system. An appropriate call denial signal is then returned to the caller. When the memory table contains the billing information, a CCIS direct signaling message is returned from the data base to the TSPS center for controlling the routine billing operation at the TSPS Center and the further completion of call connections to the called station.

Figure 1:
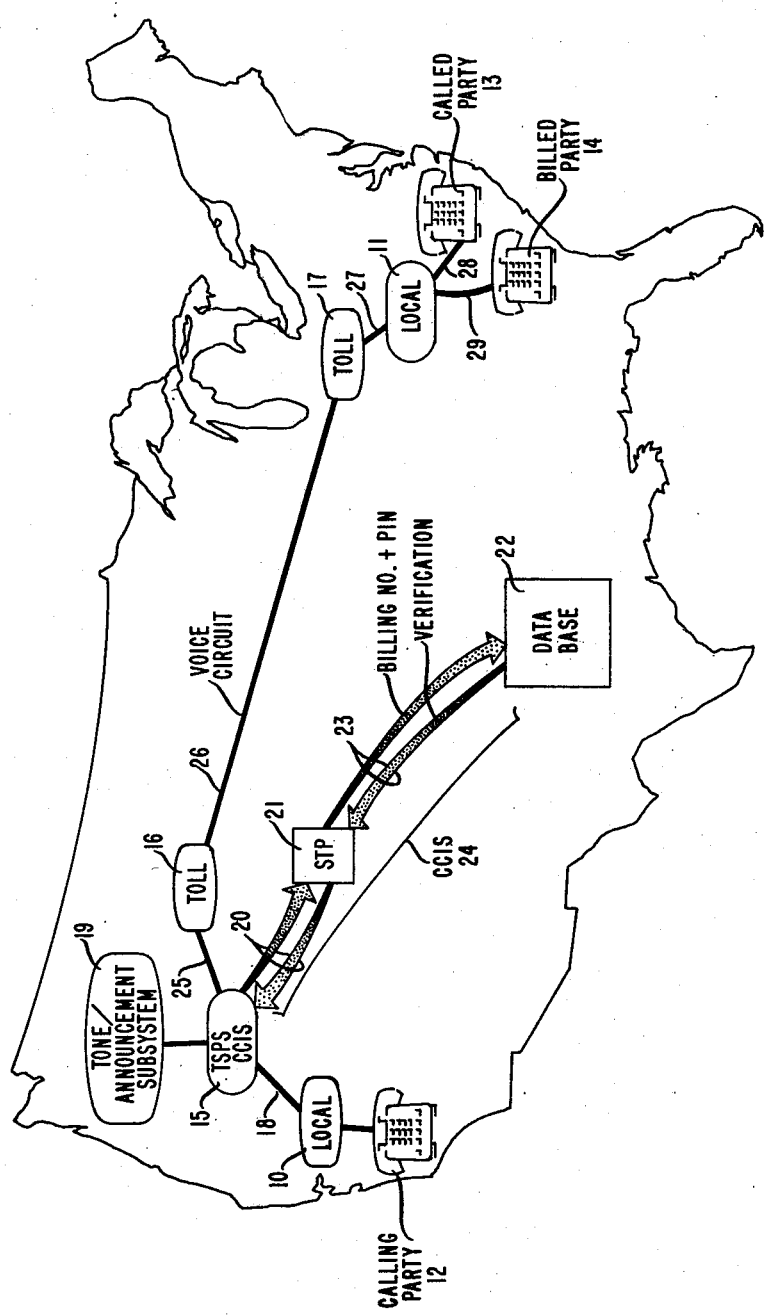
FIG. 1 shows, in block diagram form, a configuration of local and toll telephone switching offices, CCIS and signal transfer facilities, and a TSPS system together with a data base illustratively for serving special service credit and collect calls in the United States.
Figure 2:
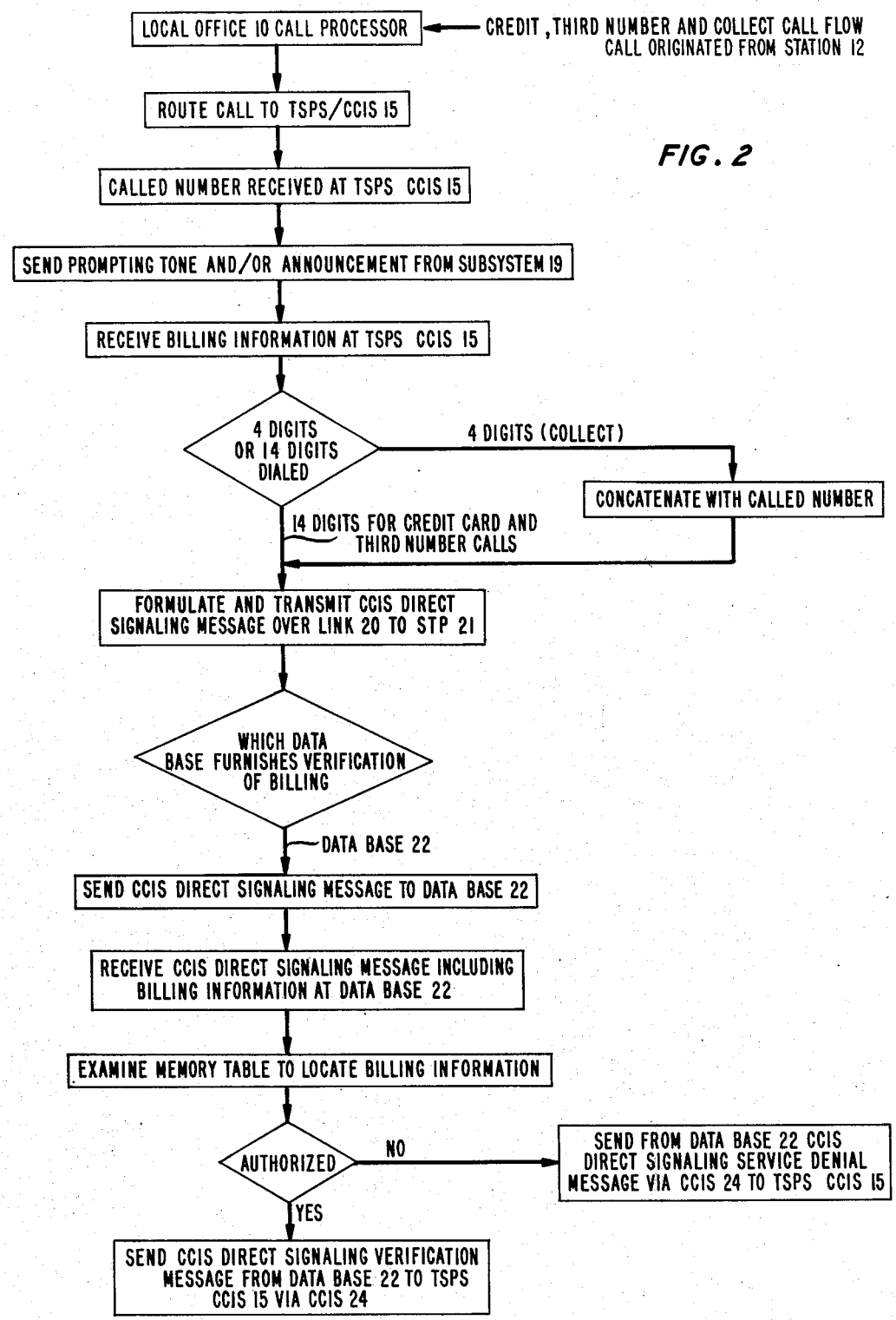
FIG. 2 is a flow diagram of the ABC service.

The drawing illustrates two local telephone switching offices, such as offices 10 and 11, which serve assoicated telephone stations, such as stations 12, 13 and 14. The drawing also discloses a TSPS system 15 and toll offices such as offices 16 and 17 which form a toll telephone network serving the local offices. The structural details of such local and toll offices and the TSPS system form no part of the present invention and are only described herein to the extent necessary for an understanding of this invention. Each of the local offices, by way of example, is suitably an electronic program controlled telephone system of the No. 1 ESS (Electronic Switching System) type disclosed in the *Bell System Technical Journal* (BSTJ), September 1964, Volume XLIII, Number 5, Parts 1 and 2; and in the R. W. Downing-H. F. May-F. F. Taylor-U. Ulrich U.S. Pat. No. 3,570,008 of Mar. 9, 1971. Those disclosures and the citations referred to therein may be consulted for a complete understanding of the construction and operations of a typical local switching office 10.

Each toll office is illustratively an electronic program controlled telephone system of the No. 4 ESS design with CCIS facilities as disclosed in the *Bell System Technical Journal* (BSTJ), September 1977, Volume 56, No. 7.

CCIS direct signaling facilities utilized in conjunction with the local and toll offices and the data base system 22 are essentially a data link, or packet, switching system for routing messages in accordance with their address data contents. CCIS system features are disclosed in the February 1978, BSTJ No. 2 and in W. B. Smith-J. B. Synnott, III U.S. Pat. No. 3,624,613 of Nov. 30, 1971.

A TSPS for serving special service calls is disclosed in the aforementioned Jaeger, Jr. et al, Dudonis and Shaer patents.

DETAILED DESCRIPTION

In FIG. 1, the processing of a special service call with ABC (Auto Bill Calling) is explained by assuming that it is originated from a calling station 12 in California to a called station, such as station 13 or 14. Such a call involves the dialing of an initial zero plus ten digits including an area code portion followed by seven digits NXX-XXXX identifying the called station. The "N" digit is any value 2–9 and each of the "X" digits is any value 0–9.

After station 12 initiates a call and dials the zero plus the area code digits and the called station number, office 10 illustratively routes the call to the toll telephone network over a trunk 18 to a TSPS system 15 equipped with CCIS facilities. Office 15 then sends an alerting signal, such as a tone or a tone and machine announcement from subsystem 19 for prompting the caller to dial the appropriate billing digits.

For credit calling from station 12, that is for credit card and charge-to-a-third number calling, to any called station number, such as station 13, the caller using the ABC service responds to the prompting signal by dialing the billing information following the dialing of the called station number. The information is a credit card number consisting of, for example, the caller's home or business telephone number plus a PIN (Personal Identification Number) credit code. The caller's number is, for example, that of station 14 in North Carolina. It includes, for example, an area code 919 plus a seven digit number 658-3399 plus a four digit PIN code (YYYY). Each of the "Y" digits comprises any value 0–9.

For a collect call from station 12 to station 14, that is where the called number is the billed number, the caller simply dials a PIN collect code upon receiving the aforementioned prompting signal. The code illustratively comprises YYYY. Each of the "Y" digits comprises any value 0–9.

Office 15 thereafter determines that the call is to be routed to a data base system for checking the entitlement of the calling party to the unrestricted credit card or collect calling. As a consequence, office 15 formulates a CCIS direct signaling message including an identification of: (1) the special service credit or collect call, (2) office 15, and (3) the credit or collect billing data information and then sends that message over the CCIS link 20 to a signal transfer point, or system 21. The latter is responsive to the received message for translating the area and office code digits of the billing information to determine that the billed customer data is stored in a data base system 22, which illustratively is located in Dallas, Tex. System 21, then forwards the CCIS message to data base 22 over a CCIS link 23. System 21 is essentially a data link, or packet, switching arrangement for CCIS applications. Structure and operations of CCIS are described in the 57 *Bell System Technical Journal* No. 2, page 230 et seq. Thus, the call is processed from the toll telephone switching network to a data base for deriving call entitlement information.

Data base system 22 is, by way of example, a suitably programmed and commercially available system which includes a system of programs to establish, edit and manage information stored in memory. It is equipped with CCIS facilities for interface communication with the signal transfer system 21 and TSPS system 15. System 22 is responsive to the received billing information for checking the credit or collect service entitlement.

Data base system 22 is equipped with a memory table (not shown) which contains a list of billing numbers entitled to ABC service. Each such number includes the station number to be billed together with its PIN code. Whenever the table contains such a billing number, calls utilizing that number are designated as entitled to the ABC service. Otherwise, in the absence of the billing number (null entry), calls sought to be charged to that number are nonauthorized for the calling customer and the calls are not to be completed.

The utilization of data in the memory table and the billing information processing operations of data base system 22 are now described for the call from station 12. After the memory table is loaded with the billing information, data system 22 is responsive to the receipt of the CCIS direct signaling message for examining its memory table to ascertain the ABC service entitlement by a look-up operation in that table. Had the look-up failed to find the billing number (null entry) correlated with that received as part of the direct signaling CCIS message, the dialed billing number would be nonauthorized to the caller. Resultingly, system 22 effects a return of a service denial CCIS direct signaling message to the TSPS system 15 via the CCIS links 23 and 20 and the signal transfer system 21. Office 15 then routinely effects a transmission of a reorder message to the caller.

System 22 determines that the credit or collect call is authorized when its look-up operation finds the billing number 919-658-3399-YYYY in the memory table. Upon finding the number, system 22 formulates and effects a transmission of a CCIS direct signaling message including an authorization signal to the TSPS system 15 via the CCIS facilities 24. Office 15 then controls the extension of the call connections to the respective station 13, or 14, illustratively over trunk 25, toll office 16, trunk 26, toll office 17, trunk 27, local office 11, and line 28 to station 13 or line 29 to station 14. The called station is then alerted to the incoming call and conversation ensues.

It is to be understood that the hereinbefore described arrangements are illustrative of specific applications of the principles of this invention. In light of this teaching it is apparent that numerous other arrangements may be devised by those skilled in the art without departing from the spirit and scope of the invention. For example, it is anticipated that operator services will in the furture be needed on certain collect and bill-to-third number calls. The present invention is applicable to such operator served calls for utilizing the data base facilities to verify, for example, that such calls are not billed to a public coin station.

Illustratively, the data base system advantageously is arrangeable to include a memory list of all coin stations within a designated area and a TSPS operator interrogates that list on special service calls to determine when collect and billing are attempted to coin stations. A typical sequence of a collect call processing is for a TSPS operator depress a collect or special service key at the TSPS console for causing a CCIS direct signaling message including the called station number to be transmitted to the data base for effecting a look-up of its memory list to determine whether an attempt is being made to bill a coin station for the special service call. If the look-up reveals that a coin station is involved, the data base formulates and sends back a service denial CCIS direct signaling message for alerting the operator to the situation. When a coin station is not so involved, a CCIS direct signaling message is sent from the data base to the TSPS for enabling the operator to further serve the call.

Reference is made to R. P. Weber (Case 1) patent application Ser. No. 924,170 filed concurrently herewith.

I claim:

1. A method of automatically deriving authorization information from a data base system for billing a special service call to a number other than the number of the station from which the call originates and characterized by
   receiving at said data base system a special service call billing message from a communication system and
   deriving a billing verification message at said data base in response to said special call billing message, and
   transmitting said verification message from said data base system to said communication system to control the further establishment of call connections in accordance with said verification message.

2. The invention of claim 1 in which said billing message is characterized by, a billed station number and a service entitlement code and
   said deriving is characterized by verifying at said data base system the entitlement to the billing and generating respective entitlement verification message, and
   said transmitting is characterized by sending the generated message from said data base system to said communication system for controlling call completion and service denial.

3. The invention of claim 2 characterized in that said billed station number and service entitlement code are keyed from the call originating station.

4. The invention of claim 3 in which said special service call comprises a credit call and further characterized in that
   said billed station number and service entitlement code are keyed from the call originating station into said communication system following a keying of the number of a called station.

5. The invention of claim 3 in which said special service call comprises a collect call and further characterized in that
   said service entitlement code is keyed from the call originating station into said communication system following a keying of the number of a called station to which the call is to be billed.

6. A method of automatically deriving verification information from a data base system for billing a special service call to a number other than the number of the station from which the call originates and characterized by
   transmitting a signal from a communication system to the calling station as an indication to key billing information into the communication system,
   receiving keyed billing information at said communication system,
   generating a CCIS message including billing data for said call,
   direct signaling said message to said data base system,
   deriving a billing verification message at said data base system in response to the CCIS message, and
   direct signaling from said data base system to said communication system a CCIS verification message to control the further establishment of call connections in accordance with said verification message.

7. The invention of claim 6 in which
   the received billing information is characterized by, a station number and a personal identification number.

8. The invention of claim 6 in which the communication system comprises a TSPS system and characterized in that
   said transmitting comprises sending a signal from said TSPS system to prompt the keying of said billing information, and
   said billing information comprises a personal identification number.

9. The invention of claim 8 in which said special service call is a credit call and further characterized in that
   said billing information is keyed from said station following a keying of a called station number and a sending of said prompting signal.

10. The invention of claim 6 in which said special service call is a collect call, and further characterized in that
    said billing information station number is a called station number received prior to said transmitting of said indication signal and
    said personal identification number is received at said communication system following said transmitting of said indication signal to said calling station.

11. A method of automatically deriving information from a data base system for billing a special service call to a number other than the number of the station from which the call originates and comprising processing said call from a calling station through a local telephone office to a TSPS center and receiving the called number at said center from said office, characterized by sending a signal from said center through said office to said calling station to prompt a caller to dial billing digits, checking the dialed digits to determine whether said call is billed as a collect, credit card or charge-to-third number call, formulating a CCIS direct signaling message including the dialed billing digits, transmitting said message to a signal transfer system, switching said message at signal transfer system to a data base, examining a memory list at said data base in response to a receipt of said message, to verify the authorization of billing to said number other than the calling station number, and sending in response to said examining CCIS direct signaling verification signals from said data base through said signal transfer system to said TSPS center for indicating the authorization of billing.

12. The invention of claim 11 characterized in that said checking of the dialed billing digits comprises determining that only four digits are dialed on a collect call and that a greater plurality of digits are dialed on credit card and charge-to-third number calls.

* * * * *

UNITED STATES PATENT AND TRADEMARK OFFICE
CERTIFICATE OF CORRECTION

PATENT NO. : 4162377
DATED : July 24, 1979
INVENTOR(S) : Allison B. Mearns

It is certified that error appears in the above-identified patent and that said Letters Patent are hereby corrected as shown below:

In the Background Art, line 17, "lase" should read --last--. Column 3, lines 5 and 6, "assoicated" should read --associated--. Column 5, line 16, "furture" should read --future--.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks